(12) United States Patent
Brandon et al.

(10) Patent No.: US 12,528,502 B1
(45) Date of Patent: Jan. 20, 2026

(54) SYSTEMS AND TECHNIQUES FOR REDUCING DISTURBANCE FROM AUTONOMOUS VEHICLE ACTIVITY

(71) Applicant: GM Cruise Holdings LLC, San Francisco, CA (US)

(72) Inventors: Jeffrey Robert Brandon, Phoenix, AZ (US); Domenico Rusciano, Concord, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 219 days.

(21) Appl. No.: 18/335,793

(22) Filed: Jun. 15, 2023

(51) Int. Cl.
*B60W 60/00* (2020.01)
*B60W 40/04* (2006.01)

(52) U.S. Cl.
CPC .......... *B60W 60/001* (2020.02); *B60W 40/04* (2013.01); *B60W 2556/10* (2020.02)

(58) Field of Classification Search
CPC . B60W 2556/10; B60W 40/04; B60W 60/001
See application file for complete search history.

(56) References Cited

U.S. PATENT DOCUMENTS

| 10,331,141 | B2* | 6/2019 | Grimm | G01C 21/3407 |
| 2011/0166731 | A1* | 7/2011 | Kristinsson | B60W 10/08 |
| | | | | 180/65.265 |
| 2013/0080053 | A1* | 3/2013 | Rakshit | G01C 21/3469 |
| | | | | 701/527 |
| 2015/0127191 | A1* | 5/2015 | Misra | G08G 1/056 |
| | | | | 701/1 |
| 2018/0308191 | A1* | 10/2018 | Matthiesen | G01C 21/3407 |
| 2018/0376306 | A1* | 12/2018 | Ramalho de Oliveira | |
| | | | | G08G 1/0112 |
| 2019/0051158 | A1* | 2/2019 | Felip Leon | G08G 1/22 |
| 2022/0164911 | A1* | 5/2022 | Stumpf | H04W 4/024 |

FOREIGN PATENT DOCUMENTS

WO WO-2016154947 A1 * 10/2016 ........... G03B 15/006

* cited by examiner

*Primary Examiner* — Kenneth M Dunne
(74) *Attorney, Agent, or Firm* — CANTOR COLBURN LLP

(57) ABSTRACT

A process for mitigating potential disturbance can include obtaining at least one of wireless activity data associated with a geographic area, vehicle traffic data associated with the geographic area, and sound data associated with the geographic area; determining, based on one or more of the wireless activity data, the vehicle traffic data, and the sound data, a disturbance factor associated with the geographic area, wherein the disturbance factor indicates a likelihood of an autonomous vehicle activity disturbing one or more persons within the geographic area; and determining, based on the disturbance factor, instructions corresponding to at least one autonomous vehicle.

21 Claims, 7 Drawing Sheets

SYSTEMS AND TECHNIQUES FOR REDUCING DISTURBANCE FROM AUTONOMOUS VEHICLE ACTIVITY

BACKGROUND

1. Technical Field

The present disclosure generally relates to autonomous vehicles (AVs) and an AV fleet management system. For example, aspects of the present disclosure relate to systems and techniques for mitigating or reducing potential disturbance caused by autonomous vehicle activity.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
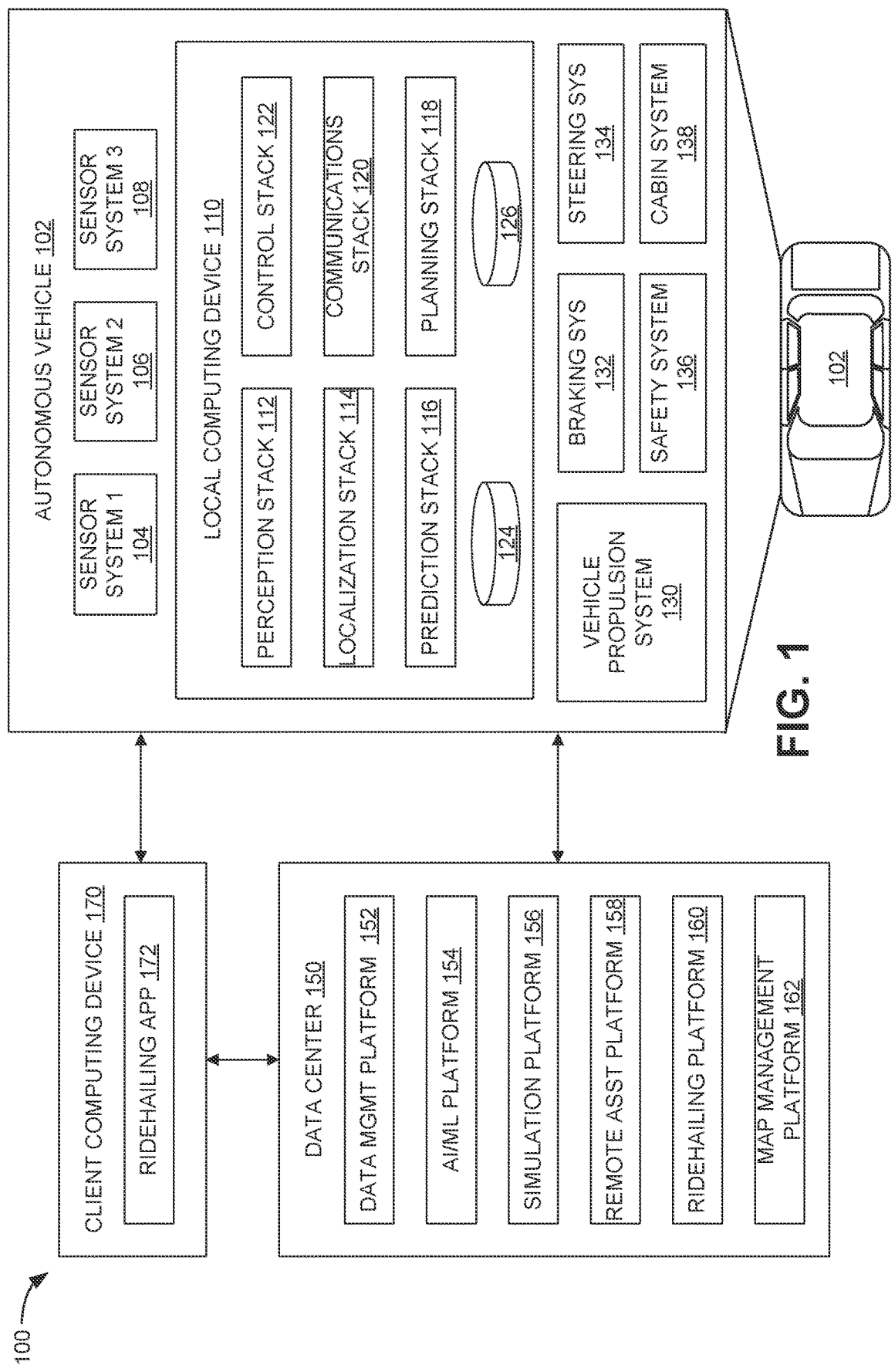
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Some ridesharing and/or ride-hailing services utilize autonomous vehicles (AVs) to transport passengers from one location to another. In contrast to other transportation services where a human driver picks up passengers and drives them to their destination, AVs can drive themselves, eliminating the need for a human driver. For example, upon receiving a ride request from a user/user device (e.g., a ride requestor), a fleet management system may match and dispatch an AV in one or more fleets of AVs to the user. In addition to matching and dispatching, the fleet management system is responsible for the operations and maintenance of the AVs in the fleet. In order to optimize the efficiency and safety of the fleet, the fleet management system needs to efficiently dispatch AVs to their respective tasks and routes, and manage timely and proper maintenance of the AV.

In some cases, certain AV operations may be disruptive to persons that are living or working in the vicinity of the AV. For example, AV operations can disrupt neighborhoods in the course of providing ride hail and/or delivery services due to the noise of door aperture and/or door closure at the beginning or end of the service and/or due to the noise associated with opening and closing the cargo box (e.g., trunk). In another example, recovery of a disabled AV (e.g., towing) may be disruptive due to the noise associated with towing a vehicle and/or the flashing lights that may be present on the tow truck. In another example, boisterous passengers may cause a disruption upon being dropped off in a quiet neighborhood during the late evening hours.

Systems, apparatuses, processes (also referred to as methods), and computer-readable media (collectively referred to as "systems and techniques") are described herein for mitigating or reducing potential disturbance caused by AV activity. In some cases, an AV fleet management system can be configured to determine a disturbance factor associated with conducting AV operations in a geographic area. In some instances, the disturbance factor may indicate a likelihood that an AV activity will cause noise disturbance and/or light disturbance within a geographic area. That is, in some aspects, a high disturbance factor may be indicative that a geographic region is more susceptible to disturbances (e.g., noise disturbance, light disturbance, traffic disturbance, etc. that may be caused by operations associated with an AV) and a low disturbance factor may be indicative that a geographic region is less susceptible to disturbances (e.g., AV operations are less likely to cause disruption). In some aspects, the AV fleet management system can direct the operations of the AV fleet based on the disturbance factor. For example, the AV fleet management system may direct one or more AVs to avoid neighborhoods that are associated with a relatively high disturbance factor. In another example, the AV fleet management system may alter the pick-up location and/or drop-off location to mitigate disturbance in a geographic area. In some cases, the AV fleet management system may alert the AV passengers of the potential for causing a disturbance. For instance, the AV fleet management system may send a message to a passenger device requesting the passenger to be mindful that the AV is entering a residential community. In some cases, the AV fleet management system may offer an incentive (e.g., discount) to a passenger in exchange for modifying a pick-up location and/or a drop-off location in order to avoid a geographic area having a relatively high disturbance factor and/or in exchange for maintaining a quiet and respectful demeanor (e.g., as observed by sensor systems on the AV).

In some aspects, the AV fleet management system may determine the disturbance factor based on one or more data types corresponding to the geographic area. For example, the disturbance factor may be based on a level of wireless activity (e.g., cellular, Wi-Fi, etc.) within a geographic area, which may be indicative of the population density in the geographic area as well as an activity (e.g., awake using internet, asleep, etc.) of the population in the geographic area. In some cases, the level of wireless activity can be determined on a real-time basis by monitoring usage of the frequency spectrum associated with the wireless transmissions and/or receptions. In some aspects, the disturbance factor may also be based on historical levels of wireless activity associated with a geographic area (e.g., wireless activity on certain days, times, holidays, etc.).

In another example, the disturbance factor may be based on traffic data associated with a geographic area. In some cases, the traffic data may include vehicle traffic and/or pedestrian traffic. That is, higher levels of vehicle traffic and/or pedestrian traffic may be indicative of a lower disturbance factor (e.g., the geographic area is already busy and is less likely to be adversely affected by disturbances caused by AVs). In some aspects, the traffic data may be obtained from a third-party service provider that is configured to monitor traffic conditions in real-time. In some instances, the traffic data may be determined based on sensor data received from the fleet of AVs. As noted with respect to the wireless activity, the traffic data may also include historical levels of traffic data (e.g., the intersection of Main St. and $1^{st}$ Avenue is heavily congested from 5:00 PM to 6:00 PM on Mondays).

In another example, the disturbance factor may be based on sensor data obtained from one or more AVs in the fleet of AVs. In some cases, the sensor data may include position data (e.g., geographic coordinates), pose data, audio data (e.g., from in-cabin microphones and/or from external microphones), light data, perception data (e.g., identification of other vehicles, objects, pedestrians, etc.), camera data, LiDAR data, any other type of sensor data, and/or any combination thereof. In some aspects, the sensor data may also include historical data. For example, the sound level at an intersection that is adjacent to a night club regularly exhibits relatively high sound amplitude between midnight and 3:00 AM on Saturdays.

In some cases, management of an AV fleet based on the disturbance factor can mitigate or reduce noise disturbance and/or light disturbance in geographic areas that are susceptible to such disruptions. In some aspects, the experience of passengers and/or people working or living in the vicinity of the AV may be improved. For example, altering a drop-off location in a residential neighborhood at 2:00 AM may avoid waking a sleeping baby or avoid causing a dog to bark. In another example, recovery (e.g., towing) of a disabled AV in a residential area during daylight hours may avoid disturbing residents that are away at work.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
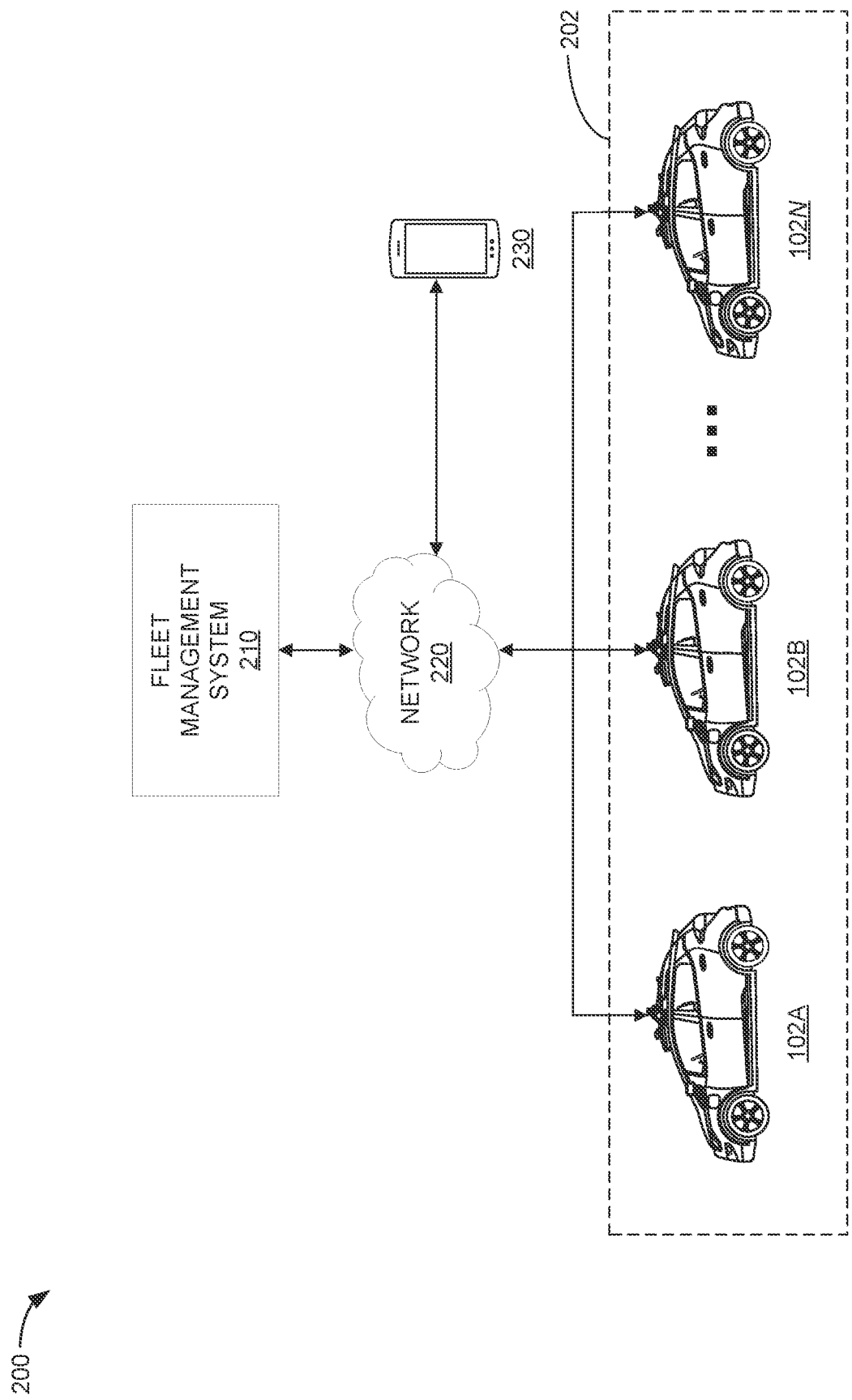
FIG. 2 illustrates an example of an AV fleet management system, according to some aspects of the present disclosure.

FIG. 2 illustrates an example system environment 200 for an AV fleet management system 210. As shown, system environment 200 includes a fleet management system 210 that may be communicatively connected, over network 220, to a user device 230 (e.g., similar to client computing device 170 as illustrated in FIG. 1) and an AV fleet 202 that can include AV 102A, AV 102B, . . . , AV 102N. Although FIG. 2 illustrates a single fleet management system 210, a single AV fleet 202, a single network 220, and a single user device 230, the present disclosure can be implemented with any number of fleet management systems, AV fleets, and/or user devices. For example, the system environment 200 may include one or more fleet management systems 210, AV fleets 202, networks 220, and/or user devices 230.

In some examples, fleet management system 210 may send and receive various signals to and from one or more AVs 102A-102N in AV fleet 202 and/or user device 230 over network 220. Non-limiting examples of network 220 can include a public network (e.g., the Internet, an IaaS network, a PaaS network, a SaaS network, other CSP network etc.), a private network (e.g., a LAN, a private cloud, a VPN, etc.), a hybrid network (e.g., a multi-cloud or hybrid cloud network, etc.), or a combination of any of the above. In some cases, fleet management system 210 may be connected to one or more types of networks (e.g., network 220), which may be used differently when communicating with user device 230 or one or more AVs 102A-102N in AV fleet 202.

In some cases, each AV 102A-102N in AV fleet 202 can be equipped with various sensors (e.g., sensor systems 104-108 as illustrated in FIG. 1) that may capture sensor data, which may be transmitted to fleet management system 210 over network 220. For example, fleet management system 210 may receive sensor data from one or more AVs 102A-102N in AV fleet 202 that may be collected while the AV is navigating in a real-world driving environment. In some cases, the sensor data may be descriptive of an environment around the AV that can be used to determine or verify a location, orientation, position, and/or pose of the AV, road conditions, sound conditions, noise, lighting conditions, grades of the road, vehicle traffic conditions, pedestrian traffic conditions, wireless activity level, temperature, weather conditions, etc.

In some examples, each AV 102A-102N in AV fleet 202 may transmit data associated with a geographic location to fleet management system 210 over network 220. For example, the data associated with a geographic location can include, without limitation, traffic data (e.g., vehicle traffic data and/or pedestrian traffic data); sound data (e.g., sound amplitude level, sound absorbability level, sound reflectivity, etc.); light data (e.g., street lighting conditions, ambient light level, etc.); wireless activity data (e.g., Wi-Fi activity level, cellular activity level, etc.); and so on. In some cases, fleet management system 210 can determine the data associated with a geographic location (e.g., wireless activity, vehicle traffic, noise level, etc.) based on sensor data provided by one or more of AV 102A-102N.

In some examples, fleet management system 210 can receive various signals and/or data from any other suitable databases/data centers (e.g., data center 150 as illustrated in FIG. 1 or a third-party data system). For example, fleet management system 210 may receive traffic data from data center 150 or a third-party data system that provides real-time traffic monitoring. In another example, fleet management system 210 may receive wireless activity data associated with a geographic area using a third-party data system (e.g., using a third-party application programming interface (API)).

In some examples, fleet management system 210 may use the data associated with a geographic location to determine a disturbance factor that is associated with the geographic area. In some cases, the disturbance factor can be indicative of the likelihood that autonomous vehicle activity within the geographic area will disturb one or more persons within the geographic area. That is, a relatively high disturbance factor may indicate that a geographic region is more susceptible to disturbances and a relatively low disturbance factor may indicate that a geographic region is less susceptible to disturbances. For instance, an AV may cause a disturbance by introducing noise to a relatively quiet environment (e.g., due to AV operation, AV servicing, AV recovery, AV passenger pick-up, AV passenger drop-off, etc.). In another example, an AV may cause a disturbance by introducing light into a relatively dark environment.

In some aspects, fleet management system 210 can use the disturbance factor to manage AV fleet 202. For instance, fleet management system 210 may determine routing instructions for one or more of AV 102A-102N based on the disturbance factor. In one example, fleet management system may route an AV to a waypoint using a route that involves a greater distance or a longer travel time in order to avoid a geographic area that has a relatively high disturbance factor. In another example, fleet management system 210 may suggest an alternative pick-up location and/or an alternative drop-off location (e.g., via user device 230) based on the disturbance factor associated with a geographic area. In another example, fleet management system 210 may determine a time for recovering a disabled AV based on the disturbance factor. That is, a tow truck may be dispatched to recover a disabled AV in a residential area during daytime hours (e.g., relatively low disturbance factor) to avoid noise disturbance and/or light disturbance associated with towing a vehicle when people are sleeping (e.g., relatively high disturbance factor). Further examples of AV fleet management based on disturbance factor are discussed herein in connection with subsequent figures.

Figure 3:
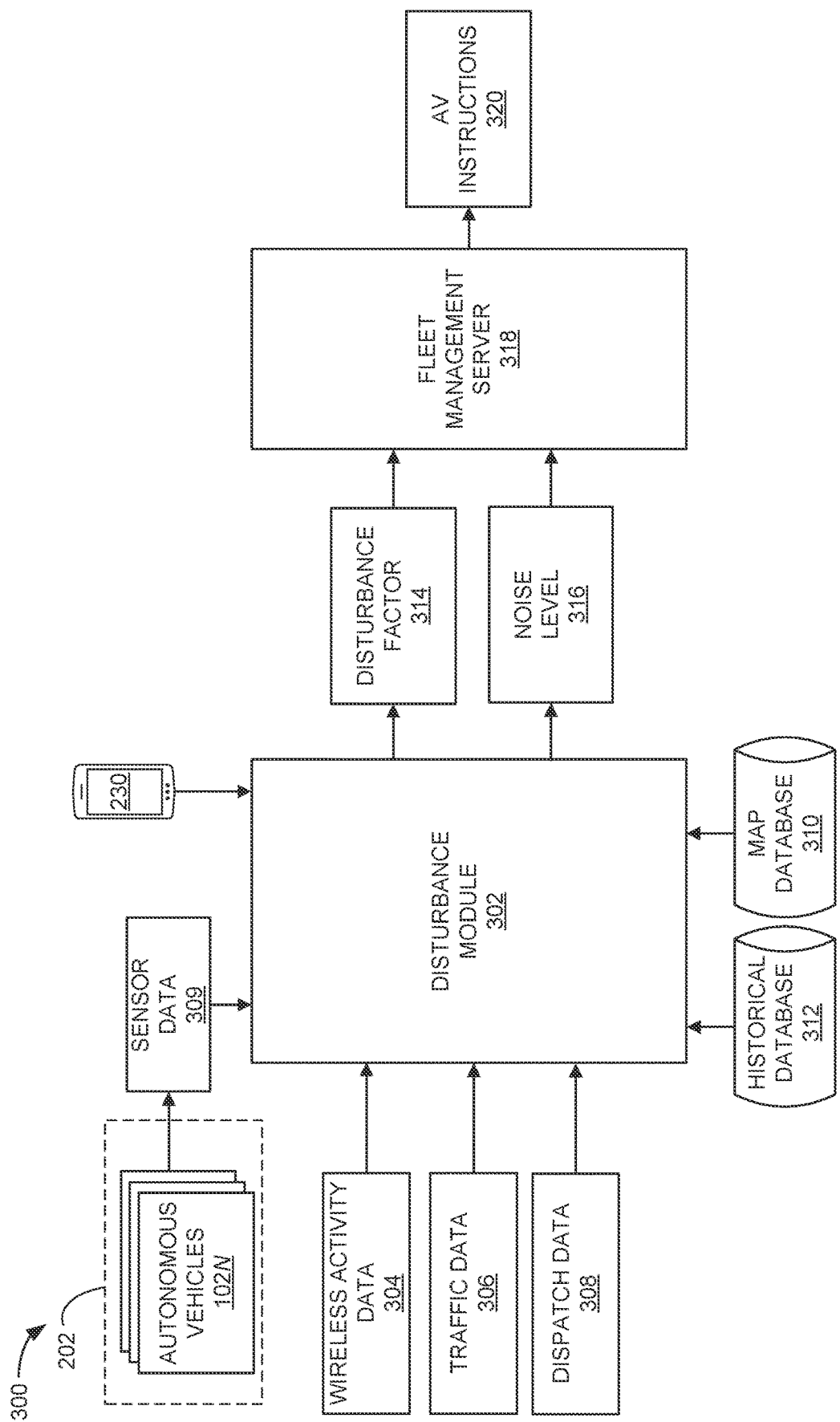
FIG. 3 illustrates another example of an AV fleet management system that includes a disturbance module, according to some aspects of the present disclosure.

FIG. 3 illustrates an example of an AV fleet management system 300. In some aspects, fleet management system 300 can include a disturbance module 302 that can be configured to determine one or more metrics (e.g., disturbance factor 314 and/or noise level 316) that can be used to mitigate or avoid noise disturbance and/or light disturbance associated with operation of AV fleet 202. That is, disturbance module 302 may send disturbance factor 314 and/or noise level 316 to fleet management server 318 and fleet management server 318 may use the disturbance factor 314 and/or the noise level 316 to generate AV instructions 320 for managing (e.g., routing, directing, etc.) a fleet of AVs (e.g., AV fleet 202). In some cases, AV fleet 202 may correspond to AV fleet 202 as described in connection with FIG. 2 (e.g., AV fleet 202 may include AVs 102-102N).

In some aspects, disturbance module 302 may obtain or receive real-time data associated with one or more geographic areas. For example, disturbance module 302 may receive wireless activity data 304 that may be associated with a geographic area. In some examples, wireless activity data 304 may include the level of cellular activity (e.g., 4G, 5G, LTE, etc.) in a geographic area. In some aspects, wireless activity data 304 may include the level of Wi-Fi activity in a geographic area. In some cases, wireless activity data 304 may be based on a number of detected transmissions and/or receptions (e.g., pings). In some instances, wireless activity data 304 may be based on data obtained from a corresponding frequency band or by monitoring the frequency spectrum. In some configurations, wireless activity data 304 may be obtained from a third-party provider such as a wireless network provider that is associated with the geographic area. In some cases, wireless activity data 304 may be received or determined based on data from AV fleet 202 (e.g., AVs 102N may include one or more sensors that can be configured to determine wireless activity data 304).

As discussed further below, wireless activity data 304 can be used by the disturbance module 302 to determine disturbance factor 314. For example, low levels of wireless activity in a residential area during daytime hours can be used to infer that there is a relatively low population density in the residential area, which may be indicative of a relatively low disturbance factor 314. In another example, a decrease in the level of wireless activity in a residential area during the evening hours can be used to infer that a majority of the population is asleep, which may be indictive of a relatively high disturbance factor.

In some examples, disturbance module 302 may obtain or receive traffic data 306. In some aspects, traffic data 306 may include vehicle traffic data and/or pedestrian traffic data. For instance, traffic data may include real-time information regarding the number of vehicles in a geographic area, the estimated drive time between two or more waypoints, data related to delays (e.g., due to accidents, construction, disabled vehicles, school zones, emergency vehicles, etc.), and/or any other vehicular traffic data. In some cases, traffic data 306 may be obtained from a third-party service provider. For example, disturbance module 302 may access Google™ Maps to determine traffic data 306. In some aspects, traffic data 306 may be received or determined based on data from AV fleet 202. For example, sensor data obtained from AV fleet 202 can be used to identify pedestrian traffic (e.g., foot traffic density) in a geographic area.

In some cases, disturbance module 302 may obtain or receive dispatch data 308. In some aspects, dispatch data 308 may include requests for ride-hailing services, ridesharing services, food/grocery delivery services, parcel delivery services, etc. that are associated with one or more waypoints. For example, a ride-hailing request can be associated with a passenger pick-up location and a passenger drop-off location. In some cases, dispatch data 308 may include a number of passengers associated with a ride-hailing service.

In some aspects, disturbance module 302 may obtain or receive sensor data 309 from one or more of AVs 102N from AV fleet 202. In some aspects, sensor data 309 from AVs 102N can include location data (e.g., geographic coordinates, address, position, orientation, pose, etc.). In some cases, the sensor data 309 from the AVs 102N may include sensor data (e.g., LIDAR data, camera data, and/or any other data obtained using sensor systems 104-108). In some aspects, sensor data 309 from the AVs 102N can include the output of one or more AV stacks (e.g., perception stack data corresponding to vehicle traffic, pedestrian traffic, etc.).

In some examples, sensor data 309 can include light data. For instance, AVs 102N can use sensors such as photodetectors to measure the ambient light in a geographic area. In another example, AVs 102N may use sensor data (e.g., LiDAR, camera, etc.) to identify light sources such as streetlights, traffic lights, building lights, etc. in a geographic area.

In some cases, sensor data 309 can include sound data. For example, AVs 102N can use one or more microphones to determine sound and/or noise within a geographic area. That is, in some aspects, the sound data can include a sound amplitude level. In some configurations, the sound data can include a sound absorbability level and/or a sound reflectivity level. In some cases, the sound absorbability level and/or the sound reflectivity level can be based on the position or pose of the AV within an environment (e.g., relative to other objects within the environment). For example, the sound reflectivity may be higher if the AV is positioned near a building.

In some instances, the sound data may include in-cabin sound measurements. For example, microphones positioned within the cabin of AVs 102N can be used to measure sound amplitude. As noted above, the present technology respects the privacy of AV passengers and it is noted that the sound data does not include audio recordings, voice recognition, and/or any other technology that could be used to identify the content of the audio and/or the identity of the speaker. That is, the in-cabin sound measurements are used for the sole purpose of determining a noise level within the cabin to inform the determination of the disturbance factor 314 (e.g., a relatively high in-cabin noise level may be indicative of loud passengers that may cause disruption upon drop-off).

In some examples, disturbance module 302 may receive data from user device 230. In some aspects, an application (e.g., ridehailing app 172) executing on user device 230 may request permission to access one or more sensors on user device 230. In some cases, the data from user device 230 may also include sound data. However, as noted above with respect to sound data collected using in-cabin microphones, the sound data received from user device 230 is only used to determine a noise level and is not stored/recorded or processed using voice recognition technology. For example, sound data from user device 230 may be used to determine noise level within the cabin of the AV. In another example, sound data from the user device 230 may be used to determine noise level at a pick-up location. That is, a high noise level at a pick-up location (e.g., a restaurant or bar) can be indicative of a geographic area having a relatively low disturbance factor 314.

In some configurations, disturbance module 302 may access map database 310. In some aspects, map database 310 may correspond to an HD geospatial database (e.g., HD geospatial database 126). For example, map database 310 may be used to determine whether a geographic area corresponds to a residential area, an industrial area, an entertainment venue, etc. In some cases, semantic data and/or labels obtained from map database 310 can be associated with wireless activity data 304, traffic data 306, dispatch data 308, and/or sensor data 309.

In some aspects, disturbance module 302 may access historical database 312. In some instances, historical database 312 can be used to store historical data corresponding to wireless data 304, traffic data 306, dispatch data 308, and/or sensor data 309. For example, disturbance module 302 can access historical database 312 to determine wireless activity data 304 for a geographic area at a time of day on a day of the week. In one illustrative example, disturbance module 302 can access historical database 312 to determine that the wireless activity is relatively high in a downtown area on a Monday at 9:30 AM. In another example, disturbance module 302 can access historical database 312 to determine that vehicle traffic is relatively high near a park on a yearly holiday (e.g., park regularly hosts a $4^{th}$ of July celebration). In another example, disturbance module 302 can access historical database 312 to determine that pedestrian traffic tends to be relatively high near a baseball stadium in the evening hours during summer months.

In some examples, historical database 312 may include a history of consumer objections or customer reports. For instance, historical database 312 may include a repository of customer reports indicating that an AV caused a disturbance within a geographic area. In one illustrative example, historical database 312 may include a list of reports indicative of a noise disturbance because an AV dropped off boisterous passengers in a residential area at 3:00 AM.

In some aspects, disturbance module 302 can use one or more of the data types described herein (e.g., wireless activity data 304, traffic data 306, dispatch data 308, sensor data 309, etc.) to determine disturbance factor 314 and/or noise level 316. In some instances, noise level 316 can be on-street noise amplitude and/or noise absorption by location (e.g., based on sensor data 309 and/or data from user device 230).

In some cases, disturbance factor 314 can be indicative of a likelihood that activities associated with AV fleet 202 will disturb one or more people in a geographic area (e.g., disturbance factor is indicative of the susceptibility to disturbance in a geographic area). In some cases, disturbance factor 314 can be classified with an integer value (e.g., value from 1 to 10). In some examples, disturbance factor 314 can be classified as "low, medium, or high." For instance, a "low" disturbance factor may indicate that AV activity within the geographic area is unlikely to cause a disturbance while a "high" disturbance factor may indicate that AV activity within the geographic area is likely to cause a disturbance and a "medium" disturbance factor may indicate that AV activity has the potential (e.g., 40% to 60% chance) to cause a disturbance. In some aspects, disturbance factor 314 can include a disturbance factor heat map which can indicate the disturbance factor relative to different locations on a map.

In some examples, disturbance module 302 may use wireless activity data 304 (e.g., alone or in connection with another data source) to infer the number of people in a geographic area and/or the activity of people in a geographic area in order to determine the disturbance factor 314. For instance, a relatively low level of wireless activity in a residential area during daytime hours can be used to infer that there is a relatively low population density in the residential area, which may be indicative of a relatively low disturbance factor 314. In another example, a relatively high level of wireless activity in a residential area during the early evening hours can be used to infer that there is a relatively high population density in the residential area and that a majority of the population density is awake, which may be indicative of a relatively high disturbance factor 314. In another example, a decrease in the level of wireless activity in a residential area in the late evening hours can be used to infer that many residents have gone to sleep, which would indicate that the disturbance factor 314 has increased. In another example, a relatively low level of wireless activity in an industrial area during the evening hours can be used to infer that there is a relatively low population density in the industrial area (e.g., a majority of workers have gone home), which may be indicative of a relatively low disturbance factor.

In some aspects, traffic data 306 can be used to inform or determine disturbance factor 314. As noted above, traffic data 306 can be obtained from a third-party service that monitors and reports real-time traffic information and/or traffic data 306 may be based on data collected by AV fleet 202 (e.g., AV fleet 202 can use sensors to identify vehicles and report to fleet management server that may aggregate sensor data to determine traffic data 306). In some cases, a relatively high level of vehicular traffic in a geographic area may be indicative of a relatively low disturbance factor (e.g., AV activity will not cause much impact because there is already a high level of traffic). In another example, a relatively low level of vehicular traffic in a geographic area may be indicative of a relatively high disturbance factor (e.g., AV activity in this geographic area has higher potential to cause disturbance because there are few vehicles on the road). In another example, a relatively high level of pedestrian traffic in a geographic area may be indicative of a relatively low disturbance factor (e.g., AV picking up a passenger at 5:00 PM near downtown). In another example, a relatively low level of pedestrian traffic in a geographic area may be indicative of a higher disturbance factor (e.g., residential neighborhood in the evening when everyone is inside homes).

In some cases, sensor data 309 from AVs 102N may be used to inform or determine disturbance factor 314 and/or noise level 316. For example, microphone data from external microphones on the AV may indicate a relatively low sound amplitude, which may be indicative of a higher disturbance factor 314 and/or a low noise level 316. In another example, a high sound amplitude (e.g., corresponding to a police siren) may be indicative of a relatively low disturbance factor 314 and/or a high noise level 316. In another example, sensor data 309 may indicate that the AV has cargo in a trunk or other storage compartment (e.g., sensors indicate that the trunk was opened at the beginning of the ride or external cameras witness the rider with a suitcase or other large object), which is likely to cause noise while being opened and closed (e.g., increase noise level 316).

In another example, sensor data 309 may include vehicle occupancy that may be based on camera sensor data and/or seat sensor data (e.g., pressure sensors embedded in AV seats). That is, higher vehicle occupancy may be indicative of higher disturbance factor 314. In some cases, vehicle occupancy may be determined using AV microphone data (e.g., the AV microphone data can detect different voices as well as the overall noise level within the AV). In some examples, AV cabin cameras may be used to determine a passenger activity level (e.g., sleeping, speaking loudly, singing, etc.) that may also be used to determine and/or inform the disturbance factor 314.

In some aspects, sensor data 309 from AVs 102N may include object detections and/or classifications in geographic areas. For example, sensor data 309 may include camera sensor data and/or LIDAR sensor data that detects objects in a neighborhood that can be used to determine or inform the disturbance factor 314. In one illustrative example, sensor data 309 may include data corresponding to an apartment building having balconies that include different items (e.g., chairs, tables, barbeques, etc.) that are indicative of population and/or noise. In another example, sensor data 309 may include data corresponding to swing sets, signs (e.g., indicating a park or warning that kids are at play), toys, etc., which may indicate that greater levels of noise are tolerable during the day but that children may be sleeping in the evening hours. In another example, sensor data 309 may include data that detects whether lights are on, or televisions are being used (e.g., by measuring the brightness of windows), which may indicate a greater level of activity in the evening.

In some examples, dispatch data 308 can be used to inform or determine disturbance factor 314. For example, dispatch data 308 indicating that an AV is transporting 4 passengers can be associated with a higher disturbance factor 314 than an AV that is transporting 1 passenger. In another example, dispatch data 308 may indicate that a group of passengers being picked up at a bar or a night club may be associated with a higher disturbance factor 314 than a group of passengers being picked up at a library.

In some aspects, disturbance module 302 may include one or more machine learning modules or implement machine learning algorithms to generate disturbance factor 314 and/or noise level 316. For example, a machine learning model can be trained to determine the disturbance factor 314 based on wireless activity data 304, traffic data 306, dispatch data 308, sensor data 309, map database 310, and/or historical database 312.

In some cases, fleet management server 318 can use disturbance factor 314 and/or noise level 316 to determine AV instructions 320. In some aspects, AV instructions 320 can include routing instructions. For example, fleet management server 318 may route one or more AVs in AV fleet 202 to avoid a geographic area having a relatively high disturbance factor 314. In another example, the routing instructions may include a passenger pick-up location and/or a passenger drop-off location. For instance, fleet management server 318 may alter the pick-up or drop-off location to avoid an area with a relatively high disturbance factor 314. In another example, the routing instructions may direct an AV to traverse a geographic area of interest in order to collect sensor data 309 that may then be used to determine or revise disturbance factor 314.

In some aspects, AV instructions 320 from fleet management server 318 may include a passenger alert. For instance, fleet management server 318 can send a message to user device 230 with a request to alter the pick-up location and/or the drop-off location. In some examples, fleet management server 318 may provide an incentive to a user (e.g., via user device 230) for agreeing to alter the pick-up location and/or the drop-off location (e.g., fleet management server 318 may offer a discount on the current ride or a future ride). In another example, the passenger alert may include a warning message advising the passenger (e.g., via user device 230) that the AV is entering an area with a high disturbance factor 314 and the passenger is encouraged to exercise discretion.

In some cases, the passenger may request a drop-off location that is near the final destination to minimize disturbance. For example, the passenger may be traveling to a home with a baby or a dog, and the passenger may request to be dropped off at some distance from the home to avoid waking the baby or causing the dog to bark during the drop-off.

In some instances, AV instructions 320 may include a vehicle service instruction or a vehicle recovery instruction. For example, fleet management server 318 may determine that an AV requiring service (e.g., flat tire repair or replacement) is positioned in a safe location and the service can be delayed until morning when the disturbance factor is lower. In another example, fleet management server 318 may determine that an AV that is disabled (e.g., requires recovery or towing) is located in a downtown area that has a low population density in the evening hours and that the recovery may therefore proceed because the disturbance factor 314 is relatively low.

In some aspects, AV instructions 320 may include a vehicle lighting configuration. For example, fleet management server 318 may instruct an AV to dim cabin lighting and/or display lighting upon entering a residential area. In another example, fleet management server 318 may instruct an AV to change the color of the cabin lighting to alert the passenger that the AV is in an area with a high disturbance factor 314. In some cases, AV instructions 320 may include a vehicle audio system configuration. For example, fleet management server 318 may instruct an AV to lower the volume or to mute the vehicle audio system when approaching an area with a relatively high disturbance factor 314. In another example, the vehicle audio system configuration may include playing relaxing or peaceful music/sounds when approaching an area with a relatively high disturbance factor 314.

Figure 4:
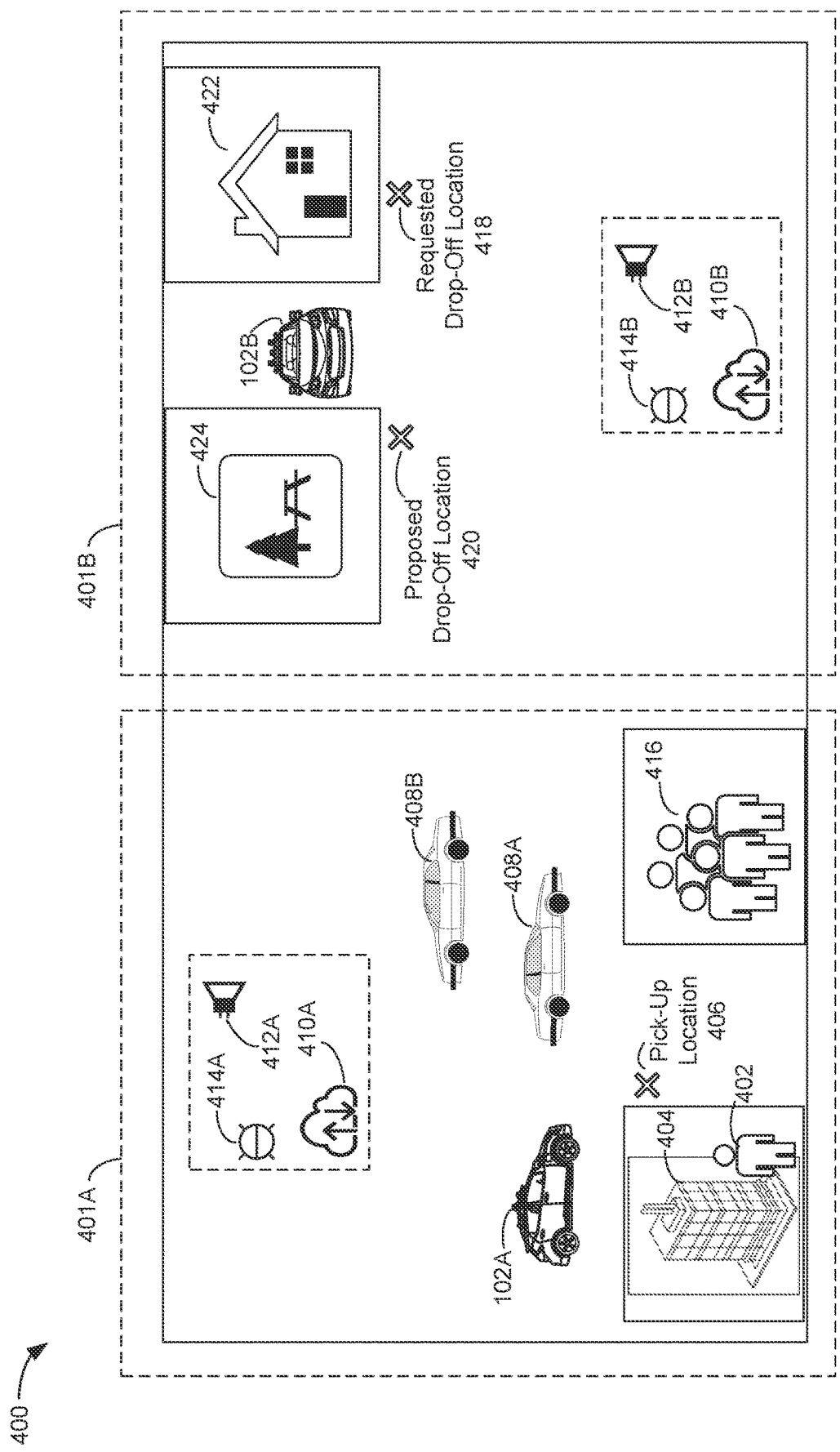
FIG. 4 illustrates an example scene for dispatching AVs to mitigate or avoid disturbance, according to some aspects of the present disclosure.

FIG. 4 illustrates an example scene 400 for managing AVs to mitigate or reduce noise disturbance and/or light disturbance. As illustrated, example scene 400 includes multiple AVs, such as AV 102A and AV 102B. As noted above, AV 102A and AV 102B can be part of a fleet (e.g., AV fleet 202), which may be managed and controlled by a fleet management system (e.g., fleet management system 210 or fleet management server 318). In some aspects, example scene 400 may include a first geographic area 401A and a second geographic area 401B. In some cases, the first geographic area 401A may include a user 402 (or a ride requestor) that is located near office building 404. In some aspects, user 402 may request a ride from pick-up location 406 to requested drop-off location 418 in the second geographic area 401B near home 422.

In some cases, a disturbance module (e.g., disturbance module 302) can receive AV data from AV 102A and/or AV 102B that can include AV sensor data (e.g., location data, audio data, camera data, LIDAR data, traffic data, etc.). In some examples, the disturbance module can use the sensor data from AV 102A and/or AV 102B to determine one or more of: wireless activity data 410A associated with first geographic area 401A; wireless activity data 410B associated with second geographic area 401B; sound data 412A associated with first geographic area 401A; sound data 412B associated with second geographic area 401B; light data 414A associated with first geographic area 401A; and light data 414B associated with second geographic area 401B.

In some examples, the disturbance module can receive wireless activity data 410A and/or wireless activity data 410B from a third-party server. In some instances, the disturbance module can receive traffic data (e.g., vehicle traffic data and/or pedestrian traffic data) from a third-party server. In some cases, the disturbance module can determine traffic data based on sensor data received from AV 102A and/or AV 102B. For example, the disturbance module can identify vehicle traffic within the first geographic area 401A based on sensor data from AV 102A that is associated with vehicle 408A and vehicle 408B (e.g., or alternatively, based on traffic data from a third-party server). In another example, the disturbance module can identify pedestrian traffic 416 within the first geographic area 401A based on sensor data from AV 102A.

In some cases, the disturbance module can determine a disturbance factor that is associated with the first geographic area 401A and/or a disturbance factor that is associated with the second geographic area 401B. For example, the disturbance module can determine that the disturbance factor associated with the first geographic area 401A is relatively low based on wireless activity data 410A being relatively high (e.g., indicative of high population density that is actively using mobile devices). In another example, the disturbance module can determine that the disturbance factor associated with the first geographic area 401A is relatively low based on the sound data 412A being somewhat high. In another example, the disturbance module can determine that the disturbance factor associated with the first geographic area 401A is relatively low based on the light data 414A being high. In another example, the disturbance module can determine that the disturbance factor associated with the first geographic area 401A is relatively low based on the vehicle traffic data corresponding to vehicle 408A and vehicle 408B. In another example, the disturbance module can determine that the disturbance factor associated with the first geographic area 401A is relatively low based on the pedestrian traffic data corresponding to pedestrian traffic 416. In another example, the disturbance module can determine that the disturbance factor associated with the first geographic area 401A is relatively low based on a classification associated with the first geographic area 401A (e.g., business or industrial area as opposed to a residential area). In another example, the disturbance module can determine that the disturbance factor associated with the first geographic area 401A is relatively low based on historical data indicating population density, noise levels, vehicle traffic, etc. on a day of the week and/or time-of-day.

In some aspects, the disturbance module may determine that the disturbance factor associated with second geographic area 401B is relatively high based on one or more of: wireless activity data 410B (e.g., low level of wireless activity); sound data 412B; light data 414B; vehicle and/or pedestrian traffic data associated with second geographic area 401B; map data (e.g., classification of second geographic area 401B as residential); historical data; any other data obtained from an AV or a third-party source; and/or any combination thereof.

In some examples, a fleet management server may use the disturbance factor(s) as determined by the disturbance module to generate autonomous vehicle instructions. For example, the fleet management server may direct AV 102A to pick-up location 406 to pick up user 402 based on a relatively low disturbance factor associated with first geographic area 401A (e.g., AV is unlikely to cause noise disturbance and/or light disturbance by operating at pick-up location 406).

In some cases, the fleet management server may use the disturbance factor associated with second geographic area 401B to determine that there is an increased likelihood of causing noise disturbance and//or light disturbance by dropping off user 402 at requested drop-off location 418. In some configurations, the fleet management server may suggest an alternative drop-off location such as proposed drop-off location 420 that is across the street from home 422 and near park 424. For example, the fleet management server may send a message to user 402 indicating that that drop-off location has been modified. In another example, the fleet management server may suggest proposed drop-off location 420 and user 402 may have the option of accepting or declining the change. In some cases, the fleet management server may offer an incentive (e.g., discount, free ride, etc.) to user 402 in exchange for accepting the change.

In some examples, the fleet management server may direct an AV through a geographic area in order to collect data associated with the area. For example, the fleet management server may direct AV 102B to drive through second geographic area 401B in order to collect wireless activity data 410B, sound data 412B, light data 414B, vehicle traffic data, pedestrian traffic data, etc. In some cases, the fleet management server may direct an AV along a route that is longer and/or more time consuming in order to avoid a geographic area having a relatively high disturbance factor. For example, fleet management server may direct AV 102A to proposed drop-off location 420 along a route that avoids one or more other geographic areas (not illustrated) that are associated with a relatively high disturbance factor.

Figure 5:
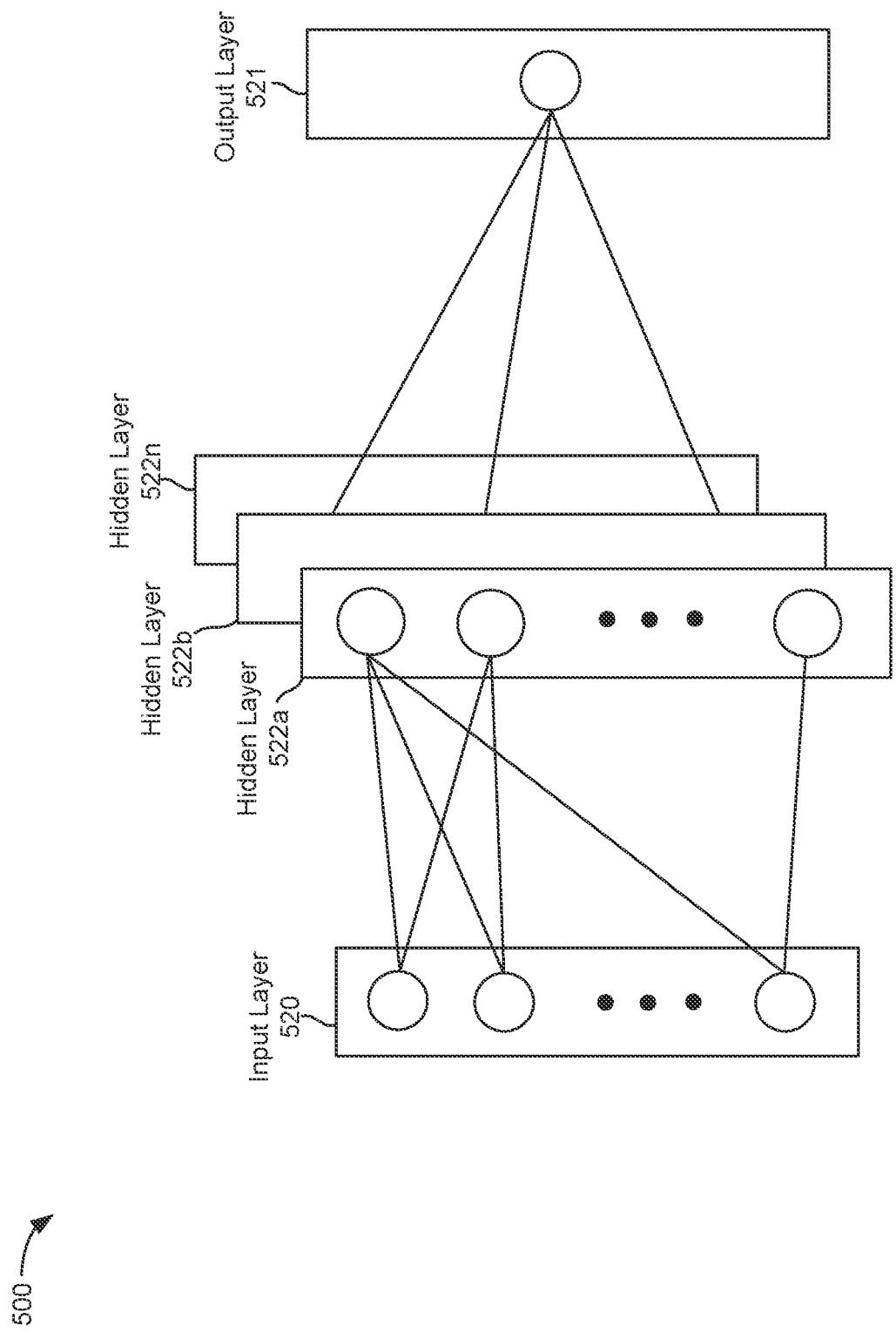
FIG. 5 illustrates an example of a deep learning neural network that can be used to implement aspects of an AV fleet management system or an AV, according to some aspects of the present disclosure.

In FIG. 5, the disclosure now turns to a further discussion of models that can be used through the environments and techniques described herein. FIG. 5 is an example of a deep learning neural network 500 that can be used to implement all, or a portion of the systems and techniques described herein as discussed above (e.g., neural network 500 can be used to implement aspects of disturbance module 302 and/or fleet management server 318). For example, an input layer 520 can be configured to receive AV sensor data (e.g., location data, pose data, camera data, LiDAR data, sound data, perception data, etc.), wireless activity data, traffic data, dispatch data, map data, and/or historical data corresponding to any of the foregoing. Neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. Neural network 500 further includes an output layer 521 that provides an output resulting from the processing performed by the hidden layers 522a, 522b, through 522n. For instance, the output may include a disturbance factor that may be associated with a geographic area and provide an indication of a likelihood that AV operations within the geographic area will cause noise disturbance and/or light disturbance. In another example, the output layer may include routing instructions for directing an AV fleet to mitigate potential disturbances (e.g., based on the disturbance factor).

Neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
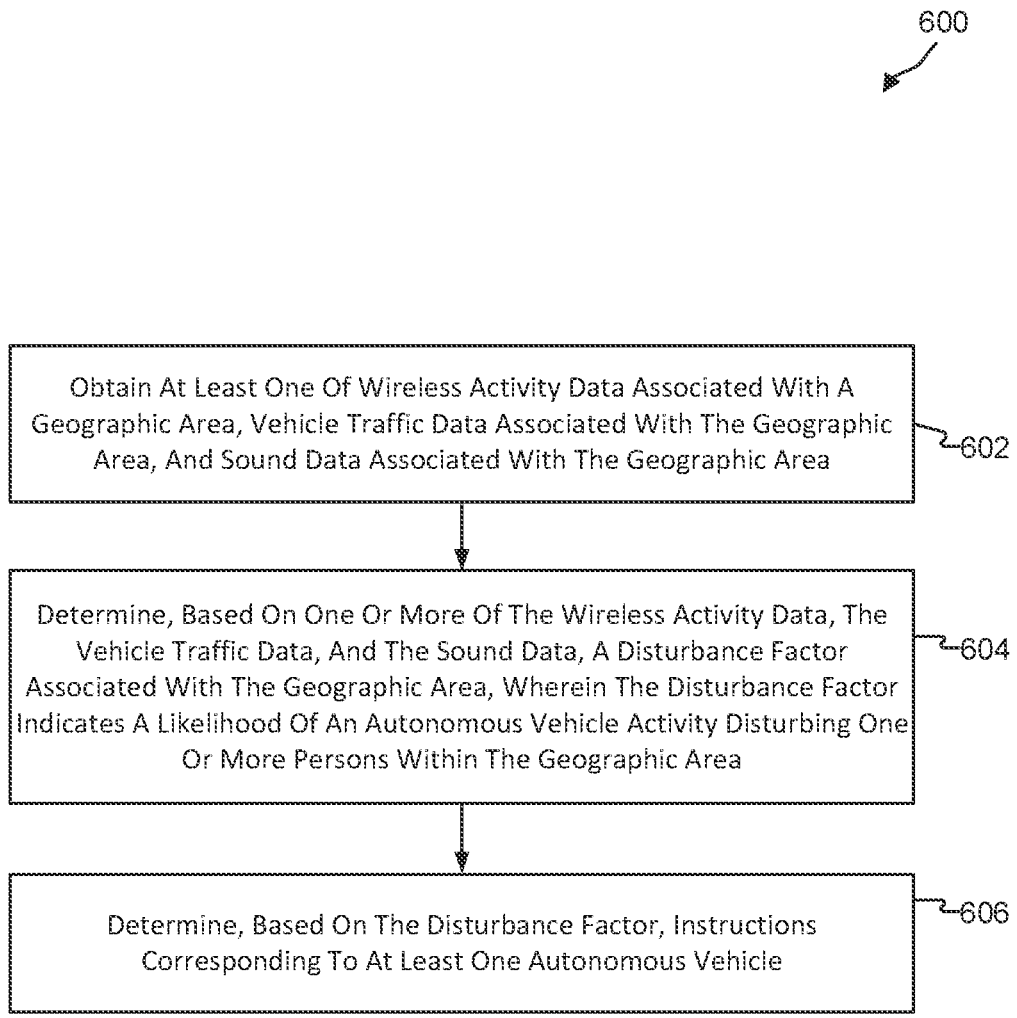
FIG. 6 illustrates an example process for routing AVs to mitigate disturbance, according to some aspects of the present disclosure.

FIG. 6 is a flowchart illustrating an example process 600 for managing a fleet of autonomous vehicles (AVs) to mitigate and/or reduce noise disturbance and/or light disturbance within a geographic area. Although the example process 600 depicts a particular sequence of operations, the sequence may be altered without departing from the scope of the present disclosure. For example, some of the operations depicted may be performed in parallel or in a different sequence that does not materially affect the function of process 600. In other examples, different components of an example device or system that implements process 600 may perform functions at substantially the same time or in a specific sequence.

At block 602, the process 600 includes obtaining wireless activity data associated with a geographic area, vehicle traffic data associated with the geographic area, and sound data associated with the geographic area. For example, disturbance module 302 may obtain wireless activity data 304, traffic data 306 (e.g., including vehicle traffic data), and sensor data 309 (e.g., including sound data), which may correspond with a geographic area such as first geographic area 401A or second geographic area 401B. In some cases, the wireless activity data associated with the geographic area can include at least one of Wi-Fi activity data and cellular activity data. In some aspects, the sound data associated with the geographic area can include at least one of a sound amplitude level and a sound absorbability level. In some configurations, the sound data associated with the geographic area is received from one or more autonomous vehicles navigating through the geographic area. For example, disturbance module 302 may receive the sound data from AVs 102N (e.g., sensor data 309 can include the sound data).

At block 604, the process 600 includes determining, based on the wireless activity data, the vehicle traffic data, and the sound data, a disturbance factor associated with the geographic area, wherein the disturbance factor indicates a likelihood of an autonomous vehicle activity disturbing one or more persons within the geographic area. For example, disturbance module 302 can determine disturbance factor 314 based on wireless activity data 304, traffic data 306 (e.g., including vehicle traffic data), and sensor data 309 (e.g., including sound data) that is associated with first geographic area 401A or second geographic area 401B. In some cases, at least one of the wireless activity data, the vehicle traffic data, and the sound data can correspond to historical data associated with the geographic area. For example, the wireless activity data, the vehicle traffic data, and/or the sound data can be obtained from historical database 312.

At block 606, the process 600 includes determining, based on the disturbance factor, instructions corresponding to at least one autonomous vehicle. For instance, fleet management server 318 can determine AV instructions 320 based on disturbance factor 314. Although disturbance module 302 and fleet management server 318 are illustrated as separate components, in some aspects, different functions associated therewith may be performed by the same or separate components. For instance, disturbance module 302 can be integrated as part of fleet management server 318. In some aspects, the instructions corresponding to the at least one autonomous vehicle can include at least one of a vehicle service instruction, a vehicle recovery instruction, a vehicle routing instruction, a vehicle passenger alert, a vehicle lighting configuration, and a vehicle audio system configuration.

In some examples, the process 600 may include obtaining pedestrian traffic data associated with the geographic area, wherein the disturbance factor is further based on the pedestrian traffic data. For instance, disturbance module 302 may obtain pedestrian traffic data from traffic data 306 and/or from AV 102N (e.g., via sensor data 309).

In some aspects, the process 600 may include sending a message to a passenger device associated with the at least one autonomous vehicle in response to determining that the disturbance factor is greater than a threshold value, wherein the message includes at least one of an alternate drop-off location, an alternate pick-up location, and a quietness notification. For example, fleet management server 318 may send a message to user device 230 in response to determining that the disturbance factor 314 is greater than a threshold value. In some cases, the message from fleet management server 318 may include an alternate drop-off location (e.g., proposed drop-off location 420), an alternate pick-up location, and/or a quietness notification.

In some cases, the process 600 can include determining an in-cabin noise level based on cabin audio data received from the at least one autonomous vehicle, wherein the disturbance factor is further based on the in-cabin noise level. For example, disturbance module 302 can determine an in-cabin noise level based on cabin audio data received from AVs 102N (e.g., sensor data 309).

In some configurations, the process 600 can include sending routing instructions directing one or more autonomous vehicles to navigate through the geographic area, wherein the one or more autonomous vehicles are configured to collect at least one of the wireless activity data, the vehicle traffic data, and the sound data. For example, fleet management server 318 may direct AV 102B to navigate through second geographic area 401B to collect wireless activity data 410B, vehicle traffic data, sound data 412B, and/or light data 414B.

Figure 7:
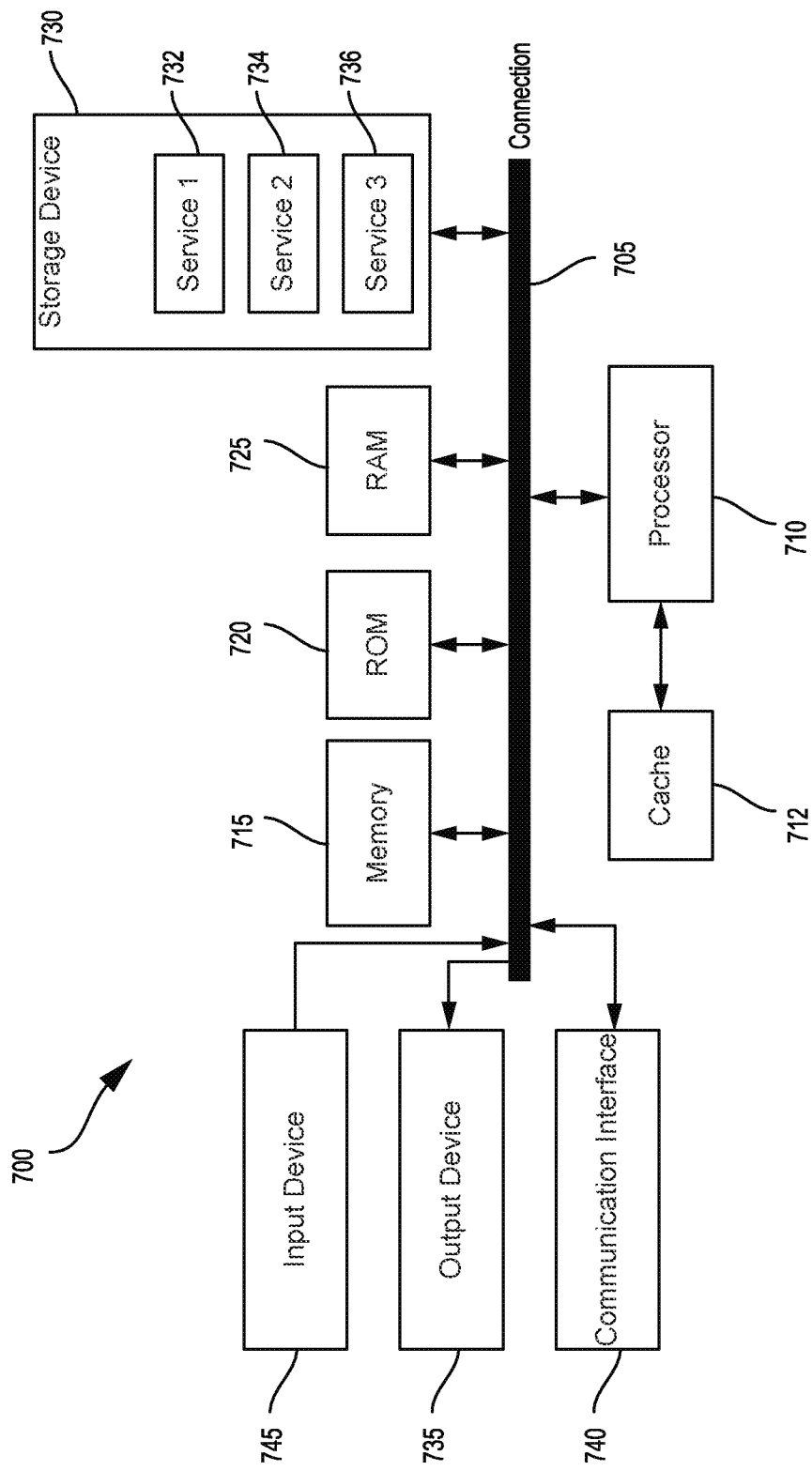
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some examples, a hardware service that performs a particular function can include the software component stored in a computer-readable medium in connection with the necessary hardware components, such as processor 710, connection 705, output device 735, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: obtaining at least one of wireless activity data associated with a geographic area, vehicle traffic data associated with the geographic area, and sound data associated with the geographic area; determining, based on one or more of the wireless activity data, the vehicle traffic data, and the sound data, a disturbance factor associated with the geographic area, wherein the disturbance factor indicates a likelihood of an autonomous vehicle activity disturbing one or more persons within the geographic area; and determining, based on the disturbance factor, instructions corresponding to at least one autonomous vehicle.

Aspect 2. The method of Aspect 1, wherein the wireless activity data associated with the geographic area includes at least one of Wi-Fi activity data and cellular activity data.

Aspect 3. The method of any of Aspects 1 to 2, further comprising: obtaining pedestrian traffic data associated with the geographic area, wherein the disturbance factor is further based on the pedestrian traffic data.

Aspect 4. The method of any of Aspects 1 to 3, wherein the sound data associated with the geographic area includes at least one of a sound amplitude level and a sound absorbability level.

Aspect 5. The method of any of Aspects 1 to 4, wherein the sound data associated with the geographic area is received from one or more autonomous vehicles navigating through the geographic area.

Aspect 6. The method of any of Aspects 1 to 5, wherein the instructions corresponding to the at least one autonomous vehicle include at least one of a vehicle service instruction, a vehicle recovery instruction, a vehicle routing instruction, a vehicle passenger alert, a vehicle lighting configuration, and a vehicle audio system configuration.

Aspect 7. The method of any of Aspects 1 to 6, wherein at least one of the wireless activity data, the vehicle traffic data, and the sound data correspond to historical data associated with the geographic area.

Aspect 8. The method of any of Aspects 1 to 7, further comprising: in response to a determination that the disturbance factor is greater than a threshold value, sending a message to a passenger device associated with the at least one autonomous vehicle, wherein the message includes at least one of an alternate drop-off location, an alternate pick-up location, and a quietness notification.

Aspect 9. The method of any of Aspects 1 to 8, further comprising: determining an in-cabin noise level based on cabin audio data received from the at least one autonomous vehicle, wherein the disturbance factor is further based on the in-cabin noise level.

Aspect 10. The method of any of Aspects 1 to 9, further comprising: sending routing instructions directing one or more autonomous vehicles to navigate through the geographic area, wherein the one or more autonomous vehicles are configured to collect at least one of the wireless activity data, the vehicle traffic data, and the sound data.

Aspect 11. An apparatus comprising: at least one memory; and at least one processor coupled to the at least one memory, wherein the at least one processor is configured to perform operations in accordance with any one of Aspects 1 to 10.

Aspect 12. An apparatus comprising means for performing operations in accordance with any one of Aspects 1 to 10.

Aspect 13. A non-transitory computer-readable medium comprising instructions that, when executed by an apparatus, cause the apparatus to perform operations in accordance with any one of Aspects 1 to 10.

What is claimed is:

1. A fleet management system comprising:
    a memory; and
    one or more processors coupled to the memory, the one or more processors being configured to:
        obtain at least one of wireless activity data associated with a geographic area, vehicle traffic data associated with the geographic area, and sound data associated with the geographic area;
        determine, based on an analysis of the wireless activity data, the vehicle traffic data, and the sound data by the one or more processors, a disturbance factor associated with the geographic area, wherein the disturbance factor is a quantitative metric which indicates a likelihood of an autonomous vehicle activity disturbing one or more persons within the geographic area;
        determine, based on the disturbance factor, instructions corresponding to at least one autonomous vehicle; and
        control the at least one autonomous vehicle based on the instructions.

2. The fleet management system of claim 1, wherein;
    the wireless activity data associated with the geographic area includes at least one of Wi-Fi activity data and cellular activity data of a population which comprises the one or more persons and is located in the geographic area;
    the one or more processors are configured to:
    determine, based on the wireless activity data, a level of wireless activity of persons comprised in the population; and
    determine the disturbance factor based on correlation between the wireless activity data and one or more of:
        a density of the population in the geographic area; and respective activity states of the persons comprised in the population.

3. The fleet management system of claim 1, wherein the one or more processors are further configured to:
obtain pedestrian traffic data associated with the geographic area, wherein the disturbance factor is further based on the pedestrian traffic data.

4. The fleet management system of claim 1, wherein the sound data associated with the geographic area includes at least one of a sound amplitude level and a sound absorbability level.

5. The fleet management system of claim 1, wherein the sound data associated with the geographic area is received from one or more autonomous vehicles navigating through the geographic area.

6. The fleet management system of claim 1, wherein the instructions corresponding to the at least one autonomous vehicle include at least one of a vehicle service instruction, a vehicle recovery instruction, a vehicle routing instruction, a vehicle passenger alert, a vehicle lighting configuration, and a vehicle audio system configuration.

7. The fleet management system of claim 1, wherein at least one of the wireless activity data, the vehicle traffic data, and the sound data correspond to historical data associated with the geographic area.

8. The fleet management system of claim 1, wherein the one or more processors are further configured to:
in response to a determination that the disturbance factor is greater than a threshold value, send a message to a passenger device associated with the at least one autonomous vehicle, wherein the message includes at least one of an alternate drop-off location, an alternate pick-up location, and a quietness notification; and
control the at least one autonomous vehicle based on a user response associated with the message.

9. The fleet management system of claim 1, wherein the one or more processors are further configured to:
determine an in-cabin noise level based on cabin audio data received from the at least one autonomous vehicle, wherein the disturbance factor is further based on the in-cabin noise level.

10. The fleet management system of claim 1, wherein the one or more processors are further configured to:
send routing instructions directing one or more autonomous vehicles to navigate through the geographic area, wherein the one or more autonomous vehicles are configured to collect at least one of the wireless activity data, the vehicle traffic data, and the sound data.

11. The fleet management system of claim 1, wherein the one or more processors are configured to determine the disturbance factor based on applying respective weights to the wireless activity data, the vehicle traffic data, and the sound data.

12. A method comprising:
obtaining at least one of wireless activity data associated with a geographic area, vehicle traffic data associated with the geographic area, and sound data associated with the geographic area;
determining, based on analyzing the wireless activity data, the vehicle traffic data, and the sound data, a disturbance factor associated with the geographic area, wherein the disturbance factor is a quantitative metric which indicates a likelihood of an autonomous vehicle activity disturbing one or more persons within the geographic area;
determining, based on the disturbance factor, instructions corresponding to at least one autonomous vehicle; and
controlling the at least one autonomous vehicle based on the instructions.

13. The method of claim 12, wherein:
the wireless activity data associated with the geographic area includes at least one of Wi-Fi activity data and cellular activity data of a population which comprises the one or more persons and is located in the geographic area; and
the method further comprises:
determining, based on the wireless activity data, a level of wireless activity of persons comprised in the population; and
determining the disturbance factor based on correlation between the wireless activity data and one or more of:
a density of the population in the geographic area; and
respective activity states of the persons comprised in the population.

14. The method of claim 12, further comprising:
obtaining pedestrian traffic data associated with the geographic area, wherein the disturbance factor is further based on the pedestrian traffic data.

15. The method of claim 12, wherein the sound data associated with the geographic area includes at least one of a sound amplitude level and a sound absorbability level.

16. The method of claim 12, wherein the sound data associated with the geographic area is received from one or more autonomous vehicles navigating through the geographic area.

17. The method of claim 12, wherein the instructions corresponding to the at least one autonomous vehicle include at least one of a vehicle service instruction, a vehicle recovery instruction, a vehicle routing instruction, a vehicle passenger alert, a vehicle lighting configuration, and a vehicle audio system configuration.

18. The method of claim 12, wherein at least one of the wireless activity data, the vehicle traffic data, and the sound data correspond to historical data associated with the geographic area.

19. The method of claim 12, further comprising:
in response to determining that the disturbance factor is greater than a threshold value, sending a message to a passenger device associated with the at least one autonomous vehicle, wherein the message includes at least one of an alternate drop-off location, an alternate pick-up location, and a quietness notification; and
controlling the at least one autonomous vehicle based on a user response associated with the message.

20. A non-transitory computer-readable media comprising instructions stored thereon which, when executed are configured to cause a computer or processor to:
obtain at least one of wireless activity data associated with a geographic area, vehicle traffic data associated with the geographic area, and sound data associated with the geographic area;
determine, based on an analysis of the wireless activity data, the vehicle traffic data, and the sound data by the computer or processor, a disturbance factor associated with the geographic area, wherein the disturbance factor is a quantitative metric which indicates a likelihood of an autonomous vehicle activity disturbing one or more persons within the geographic area;
determine, based on the disturbance factor, instructions corresponding to at least one autonomous vehicle; and
control the at least one autonomous vehicle based on the instructions.

21. The non-transitory computer-readable media of claim 20, comprising further instructions configured to cause the computer or processor to:
 in response to a determination that the disturbance factor is greater than a threshold value, send a message to a passenger device associated with the at least one autonomous vehicle, wherein the message includes at least one of an alternate drop-off location, an alternate pick-up location, and a quietness notification; and
 control the at least one autonomous vehicle based on a user response associated with the message.

* * * * *